(12) United States Patent
Tong et al.

(10) Patent No.: US 8,940,105 B2
(45) Date of Patent: Jan. 27, 2015

(54) SULFONAMIDE-DOPED UNDERCOAT FOR IMAGING DEVICE

(75) Inventors: Yuhua Tong, Webster, NY (US); Jin Wu, Webster, NY (US); Nancy L. Belknap, Rochester, NY (US); Helen R. Cherniack, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 92 days.

(21) Appl. No.: 13/472,909

(22) Filed: May 16, 2012

(65) Prior Publication Data

US 2012/0225380 A1 Sep. 6, 2012

Related U.S. Application Data

(63) Continuation of application No. 12/898,782, filed on Oct. 6, 2012, now abandoned.

(51) Int. Cl.
| | |
|---|---|
| *B08B 3/08* | (2006.01) |
| *B08B 7/00* | (2006.01) |
| *G03G 5/14* | (2006.01) |
| *G03G 5/10* | (2006.01) |
| *C08K 3/22* | (2006.01) |
| *C08K 5/435* | (2006.01) |

(52) U.S. Cl.
CPC ...... *G03G 5/142* (2013.01); *B08B 3/08* (2013.01); *G03G 5/102* (2013.01); *G03G 5/144* (2013.01); *G03G 2215/00957* (2013.01); *C08K 3/22* (2013.01); *C08K 5/435* (2013.01)
USPC ............................................. 134/42; 134/3

(58) Field of Classification Search
CPC .................. G03G 2215/00987; B08B 3/08
USPC ............................................. 134/3, 42
See application file for complete search history.

(56) References Cited

U.S. PATENT DOCUMENTS

| | | | |
|---|---|---|---|
| 7,947,418 B1 * | 5/2011 | Wu et al. .................. 430/65 |
| 2004/0220308 A1 * | 11/2004 | Paul et al. .................. 524/270 |
| 2005/0095033 A1 * | 5/2005 | Kusano et al. ............. 399/109 |
| 2009/0180788 A1 * | 7/2009 | Tamoto et al. ............. 399/48 |
| 2009/0196654 A1 * | 8/2009 | Lim ............................ 399/159 |
| 2009/0246667 A1 * | 10/2009 | Wu et al. .................. 430/77 |
| 2011/0180099 A1 * | 7/2011 | Wu et al. .................. 134/6 |

\* cited by examiner

*Primary Examiner* — Alexander Markoff
(74) *Attorney, Agent, or Firm* — MDIP LLC

(57) ABSTRACT

A photoreceptor undercoat containing a sulfonamide facilitates removal of coatings from the substrate.

18 Claims, No Drawings

SULFONAMIDE-DOPED UNDERCOAT FOR IMAGING DEVICE

FIELD

A novel undercoat for an electrostatographic imaging device component is provided. The imaging device can be used in electrophotographic or electrostatographic devices, such as, xerographic devices.

BACKGROUND

Reclaiming, recycling or reconditioning of devices heavily used; of components of devices; or of devices containing rare or toxic materials can be environmentally sound, economically advantageous and/or required.

In the electrostatographic imaging arts, the photoactive portions of most photoreceptors are composed of organic materials. The rigor and repetitive use command durability of the photoreceptors. Thus, reconditioning or reclaiming organic photoreceptors requires costly materials, and inefficient and/or time consuming methods.

Hence, a problem to be solved is developing photoreceptors which are durable and yet more amenable to reclamation by the ready deconstruction of the various components and materials comprising organic photoreceptors. That problem was solved by developing an undercoat that is easily removed from the substrate of a photoreceptor.

SUMMARY

According to aspects disclosed herein, there is provided a photoreceptor undercoat composition comprising a film-forming material, such as, a phenolic resin; a metal oxide, such as, a titanium oxide; and a sulfonamide.

One disclosed feature of the embodiments is a photoreceptor comprising an undercoat comprising a film-forming material, such as, a phenolic resin; a metal oxide, such as, a titanium oxide; and a sulfonamide.

Another disclosed embodiment is an imaging or printing device comprising a photoreceptor comprising an undercoat comprising a film-forming material, such as, a phenolic resin; a metal oxide, such as, a titanium oxide; and a sulfonamide.

DETAILED DESCRIPTION

As used herein, the term, "electrostatographic," or grammatic versions thereof, is used interchangeably with the terms, "electrophotographic" and "xerographic." The terms, "charge blocking layer" and "blocking layer," are used interchangeably with the terms, "undercoat layer" or "undercoat," or grammatic versions thereof "Photoreceptor," is used interchangeably with, "photoconductor," "imaging member" or "imaging component," or grammatic versions thereof.

For the purposes of the instant application, "about," is meant to indicate a deviation of 20% or less of a stated value or a mean value.

In electrostatographic reproducing or imaging devices, including, for example, a digital copier, an image-on-image copier, a contact electrostatic printing device, a bookmarking device, a facsimile device, a printer, a multifunction device, a scanning device and any other device, a printed output is provided, whether black and white or color, or an image of an original is recorded in the form of an electrostatic latent image on an imaging device component, such as, a photoreceptor, which may be present as an integral component of an imaging device or as a replaceable component or module of an imaging device, and that latent image is rendered visible using electroscopic, finely divided, colored or pigmented particles, or toner. The imaging device component or photoreceptor can be used in electrophotographic (xerographic) imaging processes and devices, for example, as a flexible belt or in a rigid drum configuration. Other components may include a flexible intermediate image transfer belt, which can be seamless or seamed.

The imaging device component, the photoreceptor, generally comprises one or more functional layers. Certain photoreceptors include a photoconductive layer or layers formed on an electrically conductive substrate or surface. The photoconductive layer is an insulator in the dark so that electric charge is retained on the surface thereof, which charge is dissipated on exposure to light. In some embodiments of interest, a photoreceptor includes an undercoat layer comprising a sulfonamide.

One type of composite photoconductive layer used in xerography is illustrated in U.S. Pat. No. 4,265,990 which describes an imaging device component having at least two electrically operative layers, a photoconductive layer which photogenerates holes and injects the photogenerated holes into a charge transport layer (CTL). The photoreceptors can carry a uniform negative or positive electrostatic charge to generate an image which is visualized with finely divided electroscopic colored or pigmented particles.

Embodiments of the present imaging device component or photoreceptor can be used in an electrophotographic image forming device or printing device. Hence, the imaging device component or photoreceptor is electrostatically charged and then is exposed to a pattern of activating electromagnetic radiation, such as light, which dissipates the charge in the illuminated areas of the imaging device component while leaving behind an electrostatic latent image in the non-illuminated areas. The electrostatic latent image then is developed at one or more developing stations to form a visible image, for example, by depositing finely divided electroscopic colored, dyed or pigmented particles, or toner, for example, from a developer composition, on the surface of the imaging component. The resulting visible image on the photoreceptor is transferred to a suitable receiving member, such as a paper. Alternatively, the developed image can be transferred to an intermediate transfer device, such as a belt or a drum, and the image then is transferred to a receiving member, such as a paper, or various other receiving members or substrates, such as, a cloth, a polymer, a plastic, a metal and so on, which can be presented in any of a variety of forms, such as a flat surface, a smooth surface, a textured surface, a sheet or a curved surface. The transferred colored particles are fixed or fused to the receiving member by any of a variety of means, such as, by exposure to elevated temperature and/or pressure.

Thus, a photoreceptor can include a support or substrate; which may comprise a conductive surface or a conductive layer or layers (which may be referred to herein as a ground plane layer) on an inert support; an undercoat; a charge generating layer (CGL); and a CTL. Other optional functional layers that can be included in a photoreceptor include a hole blocking layer; an adhesive interface layer; an overcoat or protective layer; a ground strip; and an anti-curl back coating layer. It will be appreciated that one or more of the layers may be combined into a single layer.

The Substrate

The imaging device component substrate (or support) may be opaque or substantially transparent, and may comprise any suitable organic or inorganic material having the requisite mechanical properties. The entire substrate can comprise an electrically conductive material, or an electrically conductive material can be a coating on an inert substrate. Any suitable electrically conductive material can be employed, such as, copper, brass, nickel, zinc, chromium, stainless steel, conductive plastics and rubbers, aluminum, semitransparent aluminum, steel, cadmium, silver, gold, indium, tin, zirconium, niobium, tantalum, vanadium, hafnium, titanium, tungsten, molybdenum and so on; or a paper, a plastic, a resin, a polymer and the like rendered conductive by the inclusion of a suitable conductive material therein; metal oxides, including tin oxide and indium tin oxide; and the like. The conductive material can comprise a single of the above-mentioned materials, such as, a single metallic compound, or a plurality of materials and/or a plurality of layers of different components, such as, a metal or an oxide, plural metals and so on.

The substrate can be an insulating material including inorganic or organic polymeric materials, such as a commercially available biaxially oriented polyethylene terephthalate, a commercially available polyethylene naphthalate and so on, with a ground plane layer comprising a conductive coating comprising one or more of the materials provided hereinabove, including a titanium or a titanium/zirconium coating, or a layer of an organic or inorganic material having a semiconductive surface layer, such as indium tin oxide, aluminum, titanium and the like. Thus, a substrate can be a plastic, a resin, a polymer and so on, such as a polycarbonate, a polyamide, a polyester, a polypropylene, a polyurethane, a polyethylene and so on.

The substrate may have a number of many different configurations, such as, for example, a plate, a sheet, a film, a cylinder, a drum, a scroll, a flexible belt, which may be seamed or seamless, and the like.

The thickness of the substrate can depend on any of a number of factors, including flexibility, mechanical performance and economic considerations. The thickness of the substrate may range from about 25 μm to about 3 mm. In embodiments of a flexible imaging belt, the thickness of a substrate can be from about 50 μm to about 200 μm for flexibility and to minimize induced imaging device component surface bending stress when a imaging device component belt is cycled around small diameter rollers, for example, 19 mm diameter rollers, in a machine belt support module.

Generally, a substrate is not soluble in any of the solvents used in the coating layer solutions, can be optically transparent or semi-transparent, and can be thermally stable up to a temperature of about 150° C. or more.

The Conductive Layer

When a conductive ground plane layer is present, the layer may vary in thickness depending on the optical transparency and flexibility desired for the electrophotographic imaging device component. When an imaging flexible belt is used, the thickness of the conductive layer on the substrate, for example, a titanium and/or a zirconium conductive layer produced by sputtering, typically ranges from about 2 nm to about 75 nm in thickness to allow adequate light transmission for proper back erase. In other embodiments, a conductive layer can be from about 10 nm to about 20 nm in thickness for a combination of electrical conductivity, flexibility and light transmission. For rear erase exposure, a conductive layer light transparency of at least about 15% can be used. The conductive layer may be an electrically conductive metal layer which may be formed, for example, on the substrate by any suitable coating technique, such as a vacuum depositing, dipping or sputtering and so on as taught herein or as known in the art, and the coating dried on the substrate using methods taught herein or known in the art. Typical metals suitable for use in a conductive layer include aluminum, zirconium, niobium, tantalum, vanadium, hafnium, titanium, nickel, stainless steel, chromium, tungsten, molybdenum, combinations thereof and the like. The conductive layer need not be limited to metals. Hence, other examples of conductive layers may be combinations of materials such as conductive indium tin oxide as a transparent layer for light having a wavelength between about 4000 Å and about 9000 Å or a conductive carbon black dispersed in a plastic binder as an opaque conductive layer.

The Hole Blocking Layer

An optional hole blocking layer may be applied, for example, to the undercoat. Any suitable positive charge (hole) blocking layer capable of forming an effective barrier to the injection of holes from the adjacent conductive layer or substrate to the photoconductive layer(s) or CGL may be used. The charge (hole) blocking layer may include polymers, such as, a polyvinyl butyral, epoxy resins, polyesters, polysiloxanes, polyamides, polyurethanes, methacrylates, such as hydroxyethyl methacrylate (HEMA), hydroxylpropyl celluloses, polyphosphazines and the like, or may comprise nitrogen-containing siloxanes or silanes, or nitrogen-containing titanium or zirconium compounds, such as, titanate and zirconate. The hole blocking layer may have a thickness of from about 0.2 μm to about 10 μm, depending on the type of material chosen as a design choice. Typical hole blocking layer materials include, for example, trimethoxysilyl propylene diamine, hydrolyzed trimethoxysilyl propyl ethylene diamine, N-β-(aminoethyl)-γ-aminopropyl trimethoxy silane, isopropyl 4-aminobenzene sulfonyl di(dodecylbenzene sulfonyl) titanate, isopropyl di(4-aminobenzoyl)isostearoyl titanate, isopropyl tri(N-ethyl aminoethylamino)titanate, isopropyl trianthranil titanate, isopropyl tri(N,N-dimethylethylamino)titanate, titanium-4-amino benzene sulfonate oxyacetate, titanium 4-aminobenzoate isostearate oxyacetate, (γ-aminobutyl)methyl diethoxysilane, (γ-aminopropyl)methyl diethoxysilane and combinations thereof, as disclosed, for example, in U.S. Pat. Nos. 4,338,387; 4,286,033; 4,988.597; 5,244,762; and 4,291,110, each incorporated herein by reference in entirety.

The blocking layer may be applied by any suitable conventional technique, such as, spraying, dip coating, draw bar coating, gravure coating, silk screening, air knife coating, reverse roll coating, vacuum deposition, chemical treatment and the like. For convenience in obtaining thin layers, the blocking layer may be applied in the form of a dilute solution, with the solvent being removed after deposition of the coating by conventional techniques, such as, vacuum, heating and the like. A weight ratio of blocking layer material and solvent of from about 0.05:100 to about 5:100 can be used for spray coating. Such deposition and forming methods for forming layers can be used for making any of the herein described layers.

The Adhesive Interface Layer

An optional adhesive interface layer may be employed. An interface layer may be situated, for example, intermediate between the hole blocking layer and the CGL. The interface layer may include a polyurethane, a polyester and so on. An example of a polyester includes a polyarylate, a polyvinyl butyral and the like.

Any suitable solvent or solvent mixture may be employed to form an adhesive interface layer coating solution. Typical solvents include tetrahydrofuran, toluene, monochlorobenzene, methylene chloride, cyclohexanone and the like, as well as mixtures thereof. Any suitable and conventional technique may be used to mix and thereafter to apply the adhesive interface layer coating mixture to the photoreceptor under construction as taught herein or as known in the art. Typical application techniques include spraying, dip coating, roll coating, wire wound rod coating and the like. Setting of the deposited wet coating may be accomplished by any suitable conventional process, such as oven drying, infrared drying, air drying and the like.

The adhesive interface layer may have a thickness of from about 0.01 μm to about 900 μm after drying. In certain embodiments, the dried thickness is from about 0.03 μm to about 1 μm.

The Charge Generating Layer

The CGL can comprise any suitable charge generating binder or film-forming material including a charge generating/photoconductive material suspended or dissolved therein, which may be in the form of particles and dispersed in a film-forming material or binder, such as an electrically inactive resin. Examples of charge generating materials include, for example, inorganic photoconductive materials, such as, azo materials, such as, certain dyes, such as, Sudan Red and Diane Blue, quinone pigments, cyanine pigments and so on, amorphous selenium, trigonal selenium and selenium alloys, such as, selenium-tellurium, selenium-tellurium-arsenic, selenium arsenide and mixtures thereof, germanium and organic photoconductive materials, including various phthalocyanine pigments, such as, the X form of metal-free phthalocyanine, metal phthalocyanines, such as, vanadyl phthalocyanine and copper phthalocyanine, hydroxygallium phthalocyanines, chlorogallium phthalocyanines, titanyl phthalocyanines, quinacridones, dibromo anthanthrone pigments, benzimidazole perylene, substituted 2,4-diaminotriazines, polynuclear aromatic quinones and the like dispersed in a film-forming material, such as, a polymer, or a binder. Selenium, selenium alloy and the like and mixtures thereof may be formed as a homogeneous CGL. Benzimidazole perylene compositions are described, for example, in U.S. Pat. No. 4,587,189, the entire disclosure thereof being incorporated herein by reference. Multi-charge generating layer compositions may be utilized where a photoconductive layer enhances or reduces the properties of the CGL. The charge generating materials can be sensitive to activating radiation having a wavelength from about 400 nm to about 900 nm during the imagewise radiation exposure step forming an electrostatic latent image. For example, hydroxygallium phthalocyanine absorbs light of a wavelength of from about 370 nm to about 950 nm, as disclosed, for example, in U.S. Pat. No. 5,756,245.

Any suitable film-forming material may be employed in a CGL, including those described, for example, in U.S. Pat. No. 3,121,006, the entire disclosure thereof being incorporated herein by reference. Typical film-forming materials include thermoplastic and thermosetting resins, such as, a polycarbonate, a polyester, a polyamide, a polyurethane, a polystyrene, a polyarylether, a polyarylsulfone, a polybutadiene, a polysulfone, a polyethersulfone, a polyethylene, a polypropylene, a polyimide, a polymethylpentene, a polyphenylenesulfide, a polyvinyl butyral, a polyvinyl acetate, a polysiloxane, a polyacrylate, a polyvinylacetal, an amino resin, a phenyleneoxide resin, a terephthalic acid resin, an epoxy resin, a phenolic resin, an acrylonitrile copolymer, a polyvinylchloride, a vinylchloride, a vinyl acetate copolymer, an acrylate copolymer, an alkyd resin, a cellulosic film former, a poly(amideimide), a styrene-butadiene copolymer, a vinylidenechloride/vinylchloride copolymer, a vinylacetate/vinylidene chloride copolymer, a styrene-alkyd resin and the like. Another film-forming material is PCZ-400 (poly(4,4'-dihydroxy-diphenyl-1-1-cyclohexane) with a viscosity-molecular weight of about 40,000. A copolymer can be a block or a graft, random or alternating, and so on.

The charge generating material can be present in the film-forming material or binder composition in various amounts. Generally, from about 5% by volume or weight to about 90% by volume or weight of the charge generating material is dispersed in about 10% by volume or weight to about 95% by volume or weight of the film-forming material or binder, or from about 20% by volume or weight to about 60% by volume or weight of the charge generating material is dispersed in about 40% by volume to about 80% by volume of the film-forming material or binder composition.

The CGL containing the charge generating material and the binder or film-forming material generally ranges in thickness from about 0.1 μm to about 5 μm, for example, or from about 0.3 μm to about 3 μm when dry. The CGL thickness can be related to film or binder content, higher film or binder content compositions generally employ thicker layers for charge generation.

In some embodiments, the CGL may comprise a charge transport molecule or component, as discussed below in regard to the CTL. The charge transport molecule may be present in some embodiments in an amount from about 1% to about 60% by weight of the total weight of the CGL.

The Charge Transport Layer

The CTL generally is superior or exterior to the CGL and may include any suitable film-forming material, such as, a transparent organic polymer or non-polymeric material capable of supporting the injection of photogenerated holes or electrons from the CGL and capable of allowing the transport of the holes/electrons through the CTL to selectively discharge the charge on the surface of the imaging device component. In one embodiment, the CTL not only serves to transport holes, but also to protect the CGL from abrasion or chemical attack and may therefore extend the service life of the imaging device component. The CTL can be a substantially non-photoconductive material, but one which supports the injection of photogenerated holes from the CGL. The CTL normally is transparent in a wavelength region in which the electrophotographic imaging device component is to be used when exposure is effected therethrough to ensure that most of the incident radiation is utilized by the underlying CGL. Thus, the CTL exhibits optical transparency with negligible light absorption and negligible charge generation when exposed to a wavelength of light useful in xerography, e.g., from about 400 nm to about 900 nm. In the case when the imaging device component is prepared with transparent materials, imagewise exposure or erase may be accomplished through the substrate with all light passing through the back side of the substrate. In that case, the materials of the CTL need not transmit light in the wavelength region of use if the CGL is sandwiched between the substrate and the CTL.

The CTL may include any suitable charge transport molecule or activating compound useful as an additive molecularly dispersed in an electrically inactive polymeric film-forming material to form a solid solution and thereby making the material electrically active. The charge transport molecule may be added to a film-forming polymeric material which is otherwise incapable of supporting the injection of photogenerated holes from the charge generation material and incapable of allowing the transport of the holes therethrough. The charge transport molecule typically comprises small molecules of an organic compound which cooperate to transport charge between molecules and ultimately to the surface of the CTL, for example, see U.S. Pat. Nos. 7,759,032 and 7,704,658.

For example, N,N'-diphenyl-N,N'-bis(3-methylphenyl)-(1,1'-biphenyl)-4,4' diamine can be used as a charge transport molecule. Other charge transport molecules include pyrazolines, diamines, hydrazones, oxadiazoles, stilbenes, carbazoles, oxazoles, triazoles, imidazoles, imidazolones, imidazolidines, bisimidazolidines, styryls, oxazolones, benzimidazoles, quinalolines, benzofurans, acridines, phenazines, aminostilbenes, aromatic polyamines, such as aryl diamines and aryl triamines, such as, aromatic diamines, including, N,N'-diphenyl-N,N'-bis(alkylphenyl)-1,1'-biphenyl-4,4-diamines; N,N'-diphenyl-N,N'-bis[3-methylphenyl]-[1,1'-biphenyl]-4,4'-diamines; N,N'-diphenyl-N,N'-bis(chlorophenyl)-1,1'-biphenyl-4,4'-diamines; N,N'-bis-(4-methylphenyl)-N,N'-bis(4-ethylphenyl)-1,1'-3,3'-dimethylbiphenyl)-4,4'-diamines; N,N'-bis-(3,4-dimethylphenyl)-4,4'-biphenyl amines; and combinations thereof. Other suitable charge transport molecules include pyrazolines, such as, 1-[lepidyl-(2)]-3-(p-diethylaminophenyl)-5-(p-diethylaminophenyl)pyrazoline, as described, for example, in U.S. Pat. Nos. 4,315,982, 4,278,746, 3,837,851, and 6,214,514; substituted fluorene charge transport molecules, such as, 9-(4'-dimethylaminobenzylidene)fluorene, as described in U.S. Pat. Nos. 4,245,021 and 6,214,514; oxadiazole transport molecules, such as 2,5-bis(4-diethylaminophenyl)-1,3,4-oxadiazole, pyrazolines, imidazoles and triazoles, as described, for example, in U.S. Pat. No. 3,895,944; hydrazones, such as p-diethylaminobenzaldehyde (diphenylhydrazone), as described, for example, in U.S. Pat. Nos. 4,150,987 4,256,821, 4,297,426, 4,338,388, 4,385,106, 4,387,147, 4,399,207, 4,399,208, and 6,124,514; and tri-substituted methanes, such as, alkyl-bis(N,N-dialkylaminoaryl) methanes, as described, for example, in U.S. Pat. No. 3,820,989. The disclosure of each of those patents is incorporated herein by reference in entirety.

The charge transport molecule may be present in some embodiments from about 1% to about 60% by weight of the total weight of the CTL or in other embodiments in an amount from about 10% to about 60% by weight of the total weight of the CTL.

Any suitable electrically inactive film-forming material or binder may be used to form the CTL. Typical inactive film-forming materials or binders include, a polycarbonate resin, a polystyrene, a polyester, a polyarylate, a polyacrylate, a polyether, a polysulfonic and the like. Molecular weights can vary, for example, from about 20,000 to about 150,000. Examples of film-forming materials or binders include a polycarbonate, such as, poly(4,4'-isopropylidene-diphenylene)carbonate (also referred to as bisphenol-A-polycarbonate or PCA), poly (4,4'-cyclohexylidine-diphenylene) carbonate (referred to as bisphenol-Z-polycarbonate or PCZ), poly(4,4'-isopropylidene-3,3'-dimethyl-diphenyl)carbonate (also referred to as bisphenol-C-polycarbonate or PCC) and the like and mixtures thereof.

Any suitable and conventional technique may be used to mix and thereafter to apply the CTL coating mixture to the photoreceptor under construction. Typical application techniques include spraying, dip coating, roll coating, wire wound rod coating and the like. Drying of the deposited coating may be obtained by any suitable conventional technique such as oven drying, infrared drying, air drying and the like.

Crosslinking agents can be used to promote polymerization of the polymer or film-forming material of the CTL. Examples of suitable crosslinking agents include an acrylated polystyrene, a methacrylated polystyrene, an ethylene glycol dimethacrylate, a bisphenol A glycerolate dimethacrylate, a (dimethylvinylsilyloxy)heptacyclopentyltricycloheptasiloxanediol and the like and mixtures thereof. The crosslinking agent can be used in an amount of from about 1% to about 20%, or from about 5% to about 10%, or from about 6% to about 9% by weight of total polymer or film-forming material content.

The CTL can be an insulator to the extent that the electrostatic charge placed on the CTL is not conducted in the absence of illumination at a rate sufficient to prevent formation and retention of an electrostatic latent image thereon. In general, the ratio of the thickness of the CTL to the CGL is from about 2:1 to about 200:1 and in some instances as great as about 400:1.

The CTL can contain variable amounts of an antioxidant, such as, a hindered phenol. A hindered phenol that can be used is octadecyl-3,5-di-tert-butyl-4-hydroxyhydrociannamate. Other suitable antioxidants are described, for example, in U.S. Pat. No. 7,018,756, incorporated herein by reference in entirety. The hindered phenol may be present in an amount up to about 10 weight % based on the concentration or amount of the charge transport molecule.

The thickness of the CTL can be from about 5 μm to about 200 μm, or from about 15 μm to about 40 μm. The CTL may comprise dual layers or plural layers, and each layer may contain a different concentration of a charge transporting component or different components.

The Ground Strip Layer

Another possible layer is a ground strip layer, including, for example, conductive particles dispersed in a film-forming material or binder, which may be applied to one edge of the imaging device component to promote electrical continuity with the conductive layer or the substrate. The ground strip layer may include any suitable film-forming material, polymer or binder and electrically conductive particles as taught herein. Typical ground strip materials include those enumerated in U.S. Pat. No. 4,664,995, the entire disclosure of which is incorporated by reference herein.

The Overcoat Layer

An overcoat layer also may be used to provide imaging device component surface protection, improved cleanability, reduced friction as well as improved resistance to abrasion.

An overcoat may comprise a dispersion of nanoparticles, such as silica, metal oxides, waxy polyethylene particles, a polytetrafluoroethylene (PTFE) and the like. The nanoparticles may be used to enhance lubricity, scratch resistance and wear resistance of an overcoat layer. In some embodiments, the nanoparticles are comprised of nanopolymeric gel particles of crosslinked polystyrene-n-butyl acrylate dispersed or embedded in a film-forming material, binder or polymer matrix.

In some embodiments, an overcoat layer may comprise a charge transport molecule or component. The charge transport molecule may be present in some embodiments in an amount from about 1% to about 60% by weight of the total weight of an overcoat layer.

An overcoat layer can include at least a film-forming material or binder, such as, a resin, and optionally, can include a hole transporting molecule, such as, a terphenyl diamine hole transporting molecule. The overcoating layer can be formed, for example, from a solution or other suitable mixture of the film-forming material or binder, such as, a resin.

The film-forming material or binder, such as, a resin, used in forming the overcoating layer can be any suitable film-forming material or binder, such as, a resin, including any of those described herein. The film-forming material or binder, such as, a resin, can be electrically insulating, semi-conductive or conductive, and can be hole transporting or not hole transporting. Thus, for example, suitable film-forming materials or binders, such as, resins, can be selected from, but are not limited to, thermoplastic and thermosetting resins such as polycarbonates, polyesters, polyamides, polyurethanes, polystyrenes, polyarylethers, polyarylsulfones, polysulfones, polyethersulfones, polyphenylene sulfides, polyvinyl acetates, polyacrylates, polyvinyl acetals, polyamides, polyimides, amino resins, phenylene oxide resins, phenoxy resins, epoxy resins, phenolic resins, polystyrenes, acrylonitriles, copolymers, vinyl acetate copolymers, acrylate copolymers, alkyd resins, styrenebutadiene copolymers, styrene-alkyd resins, polyvinylcarbazoles and the like. A copolymer may be block, graft, random or alternating.

In some embodiments, the film-forming material or binder, such as, a resin, can be a polyester polyol, such as a branched polyester polyol. The prepolymer is synthesized using a significant amount of a polyfunctional monomer, such as, trifunctional alcohols, such as triols, to form a polymer having a significant number of branches off the main polymer chain or backbone. That is distinguished from a linear prepolymer that contains only difunctional monomers, and thus little or no branches off the main polymer chain or backbone. As used herein, "polyester polyol" is meant to encompass such compounds that include multiple ester groups as well as multiple alcohol (hydroxyl) groups in the molecule, and which can include other groups such as, for example, ether groups, amino groups, sulfhydryl groups and the like.

Examples of such suitable polyester polyols include, for example, polyester polyols formed from the reaction of a polycarboxylic acid, such as, a dicarboxylic acid or a tricarboxylic acid (including acid anhydrides) with a polyol, such as, a diol or a triol. The number of ester and alcohol groups, and the relative amount and type of a polyacid and a polyol, are selected such that the resulting polyester polyol compound retains a number of free hydroxyl groups, which can be used for subsequent crosslinking or derivatization in forming the overcoat. For example, suitable polycarboxylic acids include, but are not limited to, adipic acid, pimelic acid, suberic acid, azelaic acid, sebasic acid and the like. Suitable polyols include, but are not limited to, difunctional materials, such as glycols or trifunctional alcohols, such as, triols and the like, including propanediols, butanediols, hexanediols, glycerine, 1,2,6-hexane triol and the like. Reference is made to U.S. Pub. No. 2009/0130575.

In forming the film-forming material or binder for the overcoating layer in embodiments where the film-forming material or binder is a polyester polyol, a polyol, or a combination thereof, any suitable crosslinking agent, a catalyst and the like can be included in known amounts for known purposes. For example, a crosslinking agent or an accelerator, such as a melamine crosslinking agent or an accelerator, can be included with a polyester polyol reagent to form an overcoating layer. Incorporation of a crosslinking agent or accelerator provides reaction sites to interact with the polyester polyol to provide a branched, crosslinked structure. When so incorporated, any suitable crosslinking agent or accelerator can be used, including, for example, trioxane, melamine compounds and mixtures thereof. Where melamine compounds are used, they can be suitably functionalized to be, for example, melamine formaldehyde, methoxymethylated melamine compounds, such as glycouril formaldehyde, benzoguanamine formaldehyde and the like.

Crosslinking can be accomplished by heating in the presence of a catalyst. Thus, the solution of the polyester polyol also can include a suitable catalyst. Typical catalysts include, for example, oxalic acid, maleic acid, carbollylic acid, ascorbic acid, malonic acid, succinic acid, tartaric acid, citric acid, p-toluenesulfonic acid, methanesulfonic acid and the like and mixtures thereof.

If desired or necessary, a blocking agent also can be included. A blocking agent can be used to "tie up" or block an acid effect to provide solution stability until an acidic catalyst function is desired. Thus, for example, the blocking agent can block an acid effect until the solution temperature is raised above a threshold temperature. For example, some blocking agents can be used to block an acid effect until the solution temperature is raised above about 100° C. At that time, the blocking agent dissociates from the acid and vaporizes. The unassociated acid is then free to catalyze polymerization. Examples of such suitable blocking agents include, but are not limited to, pyridine and commercial acid solutions containing such blocking agents.

Any suitable alcohol solvent may be employed for the film-forming material. Typical alcohol solvents include, for example, butanol, propanol, methanol, 1-methoxy-2-propanol and the like and mixtures thereof. Other suitable solvents that can be used in forming the overcoating layer solution include, for example, tetrahydrofuran, monochlorobenzene and mixtures thereof. The solvents can be used in addition to, or in place of, the above alcohol solvents.

A suitable hole transport material may be utilized in the overcoat layer to improve charge transport mobility of the layer. The hole transport material can be a terphenyl hole transporting molecule, such as, a terphenyl diamine hole transporting molecule. In some embodiments, the hole transporting molecule is soluble in alcohol to assist in application along with the polymer or film-forming material or binder in solution form. However, alcohol solubility is not required and the combined hole transporting molecule and film-forming material or binder can be applied by methods other than in solution, as needed.

The thickness of the overcoat layer can depend on the abrasiveness of the charging (e.g., bias charging roll), cleaning (e.g., blade or web), development (e.g., brush), transfer (e.g., bias transfer roll) etc. functions in the imaging device employed and can range from about 1 μm or about 2 μm to about 10 μm or about 15 μm or more. A thickness of between about 1 μm and about 5 μm can be used. Typical application techniques include spraying, dip coating, roll coating, extrusion coating, draw bar coating, wire wound rod coating and the like. The overcoat can be formed as a single layer or as multiple layers. Setting of the deposited coating may be obtained by any suitable conventional technique, such as, oven drying, infrared radiation drying, air drying and the like. The dried overcoating can transport holes during imaging. An overcoat may not have too high a free carrier concentration as free carrier concentration can increase dark decay. The dark decay of an overcoat can be about the same as that of the unovercoated device.

In the dried overcoating layer, the composition can include from about 40% to about 90% by weight of film-forming material or binder, or from about 60% to about 10% percent by weight of hole transporting molecule.

The Anti-Curl Back Coating Layer

An anti-curl back coating may be applied to the surface of a substrate opposite to that bearing the photoconductive layer (s) to provide flatness and/or abrasion resistance, such as, when a web configuration imaging device component is contemplated. The anti-curl back coating layer is known and can comprise a film-forming material or binder, such as, thermoplastic organic polymers or inorganic polymers that are electrically insulating or slightly semiconductive. The thickness of anti-curl back coating layers generally is sufficient to balance substantially the total forces of the layer or layers on the opposite side of a substrate. An example of an anti-curl back coating layer is described in U.S. Pat. No. 4,654,284, the disclosure of which is incorporated herein by reference in entirety. A thickness of from about 70 μm to about 160 μm can be used for a flexible device imaging component, although the thickness can be outside that range as a design choice.

Because conventional anti-curl back coating formulations can suffer from electrostatic charge build up due to contact friction between the anti-curl layer and, for example, backer bars, which can increase friction and wear, incorporation of compounds to dissipate charge, such as, nanopolymeric gel particles, into the anti-curl back coating layer can substantially eliminate charge build up. In addition to reducing electrostatic charge build up and reducing wear in the layer, a charge dissipating material, such as, nanopolymeric gel particles, may be used to enhance lubricity, scratch resistance and wear resistance of the anti-curl back coating layer. In some embodiments, the nanopolymeric gel particles are comprised of crosslinked polystyrene-n-butyl acrylate, which are dispersed or embedded in a film-forming material or binder, such as, a polymer or a matrix.

In some embodiments, the anti-curl back coating layer may comprise a charge transport molecule or component. The charge transport molecule may be present from about 1% to about 60% by weight of the total weight of the anti-curl back coating layer.

The Undercoat

A binder or film-forming material or substance, such as, a resin, a casein, a phenolic resin, a polyol, such as an acrylic polyol, an aminoplast resin, a polyvinyl alcohol, a nitrocellulose, an ethylene-acrylic acid copolymer, a polyamide, a polyurethane or a gelatin can be used, and the layer formed, for example, by dip coating. Examples of polyol resins include, but are not limited to, polyglycol, polyglycerol and mixtures thereof. The aminoplast resin can be, but is not limited to, urea, melamine and mixtures thereof.

In various embodiments, phenolic resins can be considered condensation products of an aldehyde and a phenol compound in the presence of an acidic or basic catalyst. The phenol compound may be, for example, phenol, alkyl-substituted phenols, such as, cresols and xylenols, halogen-substituted phenols, such as, chlorophenol, polyhydric phenols, such as, resorcinol or pyrocatechol, polycyclic phenols, such as, naphthol and bisphenol A, aryl-substituted phenols, cycloalkyl-substituted phenols, aryloxy-substituted phenols and combinations thereof. The phenol compound may be for example, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, multiple ring phenols and combinations thereof. The aldehyde may be, for example, formaldehyde, paraformaldehyde, acetaldehyde, butyraldehyde, paraldehyde, glyoxal, furfuraldehyde, propinonaldehyde, benzaldehyde and combinations thereof. The phenolic resin may be, for example, selected from dicyclopentadiene-type phenolic resins, phenol novolak resins, cresol novolak resins, phenol aralkyl resins and combinations thereof, see U.S. Pat. Nos. 6,255,027, 6,155,468, 6,177,219, and 6,156,468, each incorporated herein by reference in entirety. Examples of phenolic resins include, but are not limited to, formaldehyde polymers with p-tert-butylphenol, phenol and cresol; formaldehyde polymers with ammonia, cresol and phenol; formaldehyde polymers with 4,4'-(1-methylethylidene)bisphenol; formaldehyde polymers with cresol and phenol; or formaldehyde polymers with p-tert-butylphenol and phenol.

The phenolic resins can be used as purchased or can be modified to enhance certain properties. For example, the phenolic resins can be modified with suitable plasticizers, including, but not limited to, a polyvinyl butyral, a polyvinyl formal, an alkyd, an epoxy resin, a phenoxy resin (bisphenol A or epichlorohydrin polymer), a polyamide, an oil and the like.

Various types of fine particles and metallic oxides can be added to adjust the resistance of the undercoat layer. Examples of such metallic oxides include alumina, zinc oxide, aluminum oxide, silicon oxide, zirconium oxide, molybdenum oxide, titanium oxide, tin oxide, antimony oxide, indium oxide and bismuth oxide. Examples also include extra fine particles of tin-doped indium oxide, antimony-doped tin oxide and antimony-doped zirconium oxide. A single species of a metallic oxide can be used or two or more types can be used in combination. When two or more are used, the plural oxides can be used in the form of a solid solution or a fused substance. The average particle size of a metallic oxide can be about 0.3 μm or less, or about 0.1 μm or less. In some embodiments, metallic oxide particles can be surface treated. Surface treatments include, but are not limited to, exposure of the particles to aluminum laurate, alumina, zirconia, silica, silane, methicone, dimethicone, sodium metaphosphate and the like and mixtures thereof.

The solvent used for preparing the undercoat, depending on the presence of additives therein, is one capable of, for example, effective dispersion of inorganic particles and dissolution of the film-forming material or substance. A suitable solvent can be an alcohol, such as those containing 1, 2, 3, 4, 5 or 6 carbons, such as, ethanol, n-propyl alcohol, isopropyl alcohol, n-butanol, t-butanol and sec-butanol. Further, to improve storage ability and particle dispersion, it is possible to use an auxiliary solvent. Examples of such an auxiliary solvent are methanol, benzyl alcohol, toluene, methylene chloride, cyclohexane and tetrahydrofuran.

When particles are dispersed in a binder, resin or film-forming material or substance to prepare an undercoat, the particles can be present in an amount of about 20 wt % to about 80 wt %; from about 30 wt % to about 70 wt %; from about 40 wt % to about 60 wt %; or from about 50 wt % to about 60 wt % of the total weight of undercoat materials. In other embodiments, the particles can be present in an amount from about 30 wt % to about 80 wt %; from about 40 wt % to about 80 wt %; from about 50 wt % to about 80 wt %; from about 60 wt % to about 80 wt %; from about 20 wt % to about 70 wt %; from about 40 wt % to about 70 wt %; or from about 50 wt % to about 70 wt %; from about 60 wt % to about 70 wt %; from about 20 wt % to about 60 wt %; or from about 30 wt % to about 60 wt % of the total weight of undercoat materials.

An ultrasonic homogenizer, ball mill, sand grinder or homomixer can be used to disperse the inorganic particles.

The method of setting the undercoat can be selected as appropriate in conformity with the type of solvent and film thickness. For example, drying by heat can be used.

The film thickness of the undercoat layer can be about 0.1 μm to about 30 μm, or from about 1 μm to about 20 μm, or from about 4 μm to about 15 μm. Thus, the undercoat can be about 5 μm, about 6 μm, about 7 μm, about 8 μm, about 9 μm, about 10 μm, about 11 μm, about 12 μm, about 13 μm or about 14 μm in thickness.

Photoreceptor Deconstruction

Photoreceptors can be salvaged for reuse or the components recycled if the various layers thereon can be removed readily from the substrate. Various methods currently are employed, including cutting or lathing the layers from the substrate; exfoliating the layers by repeated heating and cooling; heating followed by a chemical treatment; rigorous chemical treatment; and heating under vacuum. Each of those methods, however, has limitations. For example, the removal processes are labor intensive; require an inordinate amount of manufacturing space; use toxic materials or materials requiring special disposal procedures; and may involve heat and solvents which can damage the substrate. Some of the methods also may generate dust or emit harmful vapors or poisonous substances and may use or produce environmentally incompatible solvents and products. Often, the processes are costly, making selling the photoreceptor as scrap more cost effective.

Electrophotographic imaging device components with a drum configuration require additional steps for reuse or recycling. For example, drum-type photoreceptors are usually supported on an electrically conductive shaft by hubs or end flanges. Often the hub or end flange is secured to the end of the drum by a resin adhesive. To clean and to recycle the used or defective drum-type photoreceptor, the hubs or end flanges must be removed and the resin adhesive must be stripped off the photoreceptor. Such removal techniques may damage the underlying substrate, may involve complex equipment, are time intensive and may involve solvents which require special handling and/or disposal.

Thus, there is a need for a photoreceptor material or component that facilitates removal of the layers from a substrate, which will reduce pollution, which will reduce the area dedicated to photoreceptor salvage, which reduces the need to scrap an otherwise recyclable photoreceptor, which enables reuse of the substrate, which enables recycling and regeneration of materials comprising the various layers, and which is faster and relatively less costly to implement than current, conventional removal or stripping methods.

Incorporation of a sulfonamide in an undercoat, and optionally, if present, also in a hole blocking layer, provides a layer(s) that continues to provide the functions ascribed and desired for an undercoat, or a hole blocking layer when present, as described herein and as known in the art, while also providing for a layer that can be removed from a substrate under conditions that do not require toxic solvents, extreme temperatures, a vacuum and so on, as currently used. In some embodiments, the terms undercoat and hole blocking layer are used interchangeably, or refer to a single layer with combined functions, which layer is the first layer applied to a substrate.

When deconstructing a sulfonamide-doped undercoat as taught herein, a stripping solvent comprising about 75% to about 85% w/v or v/v of an aprotic polar material; about 5% to about 15% w/v or v/v of a weak acid, such as, an organic acid containing a carboxylic acid; and the remainder, when needed, being water, can be used with the sulfonamide-doped undercoat of interest, and devices carrying same. Examples of an aprotic polar material include dimethyl sulfoxide, formamide, dioxane, tetrahydrofuran, dichloromethane, ethyl acetate, acetone, acetonitrile, N-methylpyrrolidone and so on, as known in the art. Examples of weak acids include lactic acid, citric acid, acetic acid, formic acid, oxalic acid, uric acid and so on. The treatment can be conducted at about 65° C. to about 95° C. For example, a stripping solution composed of 80% N-methylpyrrolidone, 8% citric acid and 12% water completely removed all organic layers including a sulfonamide-doped undercoat from a substrate when the photoreceptor was incubated in that stripping solvent for 5 minutes at 85° C.

Suitable sulfonamides that can be used in an undercoat of interest have the following formula:

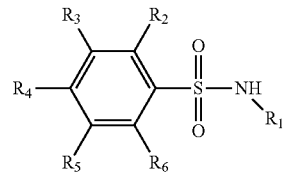

wherein $R_1$ is H or an alkyl which can range from 1 carbon to about 20 carbons in length. The alkyl can be linear, cyclic or branched, or can contain one or more rings of varying size. Hence, the alkyl can be a methyl, ethyl, propyl, butyl, pentyl, hexyl, heptyl, octyl, nonyl, decyl and so on group, including hydrocarbons containing 11, 12, 13, 14, 15, 16, 17, 18 19 or 20 carbons. The alkyl group can be saturated or can contain one or more double or triple bonds. One or more of the carbons of an R group can be substituted with a functional group, such as a hydroxyl, a sulfhydryl, an amino and so on group.

Each of $R_{2-6}$ is H or an alkyl which can range from 1 carbon to about 20 carbons in length. The alkyl can be linear, cyclic or branched, or can contain one or more rings of varying size. Hence, the alkyl can be a methyl, ethyl, propyl, butyl, pentyl, hexyl, heptyl, octyl, nonyl, decyl and so on group, including hydrocarbons containing 11, 12, 13, 14, 15, 16, 17, 18 19 or 20 carbons. The alkyl group can be saturated or can contain one or more double or triple bonds. One or more of the carbons of an R group can be substituted with a functional group, such as a hydroxyl, a sulfhydryl, an amino and so on group.

In some embodiments, $R_1$ is H. In other embodiments, $R_1$ is $C_1$ to about $C_5$. Also, one or more of the carbons can be substituted. Suitable substituents include hydroxyl, sulfhydryl and amino. In other embodiments, each of $R_2$-$R_6$ is H. In yet other embodiments, $R_2$ or $R_6$ is $C_1$ to about $C_3$, with the remaining R groups on the benzyl group being H. In some embodiments, $R_2$ or $R_6$ is methyl, with the remaining R groups on the benzyl group being H.

Examples of suitable sulfonamides that can be used in an undercoat of interest are available commercially, for example, from Unitex Chemical Corp., Greensboro, N.C., where such compounds are included in the Uniplex product line, and include N-butyl benzene sulfonamide (Uniplex 214), o,p-toluene sulfonamide (Uniplex 171), N-ethyl-o,p-toluene sulfonamide (Uniplex 108) and N-(2-hydroxylpropyl)benzene sulfonamide (Uniplex 225). Each species of sulfonamide can be used alone or in combination.

The sulfonamide is mixed with the other components of an undercoat forming liquid, or optionally, in a hole blocking layer, if present, forming liquid, and thus, is one which is soluble in the solvent(s) used. The total amount of sulfonamide used is about 1% to about 10%; about 2% to about 9%; about 3% to about 8%; about 4% to about 7%; or about 5% to about 6% by weight or volume of the total volume of undercoating solution. Once the sulfonamide is in solution, the undercoat is formed and is set as taught herein, such as dip coating with heating or other form of drying.

Thus, an undercoat of interest is one which does not impact negatively any of the functions normally ascribed to an undercoat and does not impact negatively the overall function of a photoreceptor. Thus, the electrical properties of the photoconductor, as evidenced for example, by PIDC's, are comparable to that of a control photoconductor not containing or lacking a sulfonamide-doped undercoat; or there is no adverse impact on print quality, as evidenced, for example, in comparable levels of ghosting, for example A zone and/or J zone ghosting as compared to a photoreceptor comprising an undercoat lacking a sulfonamide; or the undercoat adheres to the substrate to the same extent as a control undercoat lacking a sulfonamide. However, an undercoat of interest is one which is removed from a substrate using normal solvents and buffers, for example, a buffer containing an aprotic polar material and/or a weak acid, and under unremarkable treatment conditions, such as, at atmospheric pressure, that is, a vacuum is not needed and/or temperatures less than about 100° C., less than about 95° C., less than about 90° C., less than about 85° C., less than about 80° C., less than about 75° C. and so on.

An undercoat, and when present, optionally, a hole blocking layer, of interest, is used in a photoreceptor as provided herein. Then, the remaining layers to yield a functional photoreceptor are added to the undercoat, at least a CGL and a CTL, as taught herein or as known in the art. An undercoat of interest can be used with any organic photoreceptor independent of the specific substrate and independent of the specific other layers that comprise a photoreceptor. The completed photoreceptor is engaged in an imaging device as known in the art to enable the production of an image product, for example, photocopies. Hence, such an imaging device can comprise a device for producing and removing an imagewise charge on the photoreceptor. The imaging device can contain a developing component for applying a developing composition, such as a finely divided pigmented material to said charge retentive surface of said photoreceptor to yield an image on the surface of said photoreceptor. Such an imaging device also may include an optional transferring component for transferring the developed image from the photoreceptor to another member or to a copy substrate or receiving member. The imaging device also contains a component for affixing the finely divided pigmented material onto a receiving member. It will be evident the photoreceptor can be disposed as a removable or replaceable component of the imaging device. The photoreceptor, when treated with the stripping solvent of interest, as provided herein, will yield a reusable substrate and a solution containing the organic layer components suspended or dissolved therein.

Hence, should there be a defect in a photoreceptor, a photoreceptor is showing wear or an imaging device is targeted for replacement, a photoreceptor of interest can be destined for ready reclamation, reconditioning or recycling of the components thereof in a safe and cost efficient fashion by exposing a photoreceptor of interest comprising an undercoat of interest to a stripping solvent, such as that taught herein, to obtain a substrate free of coatings and the various coating components in solution.

Various embodiments of interest now will be exemplified in the following non-limiting examples.

EXAMPLES

Comparative Example 1

A hole blocking layer or undercoat layer dispersion was prepared by milling 18 g or 60 wt % of $TiO_2$ (MT-150W, manufactured by Tayca Co., Japan), and 24 g or 40 wt % of the phenolic resin, VARCUM™ 29159, (OxyChem Co., a formaldehyde, phenol, p-tert-butylphenol, cresol polymer in a solvent mixture of xylene/1-butanol, 50/50, weight average molecular weight, $M_w$, of 2,000) with a total solid content of about 48 wt % in an attritor mill with about 0.4 mm to about 0.6 mm diameter $ZrO_2$ beads for 6.5 hours. The dispersion was filtered though a 20 µm Nylon filter. A 30 mm aluminum drum substrate then was coated with the aforementioned filtered dispersion by spray coating. After drying at 160° C. for 20 minutes, a hole blocking layer of $TiO_2$ and the phenolic resin ($TiO_2$/phenolic resin ratio of 60/40) about 8 µm in thickness was obtained.

A photogenerating layer comprising chlorogallium phthalocyanine was deposited on the above hole blocking layer or undercoat layer at a thickness of about 0.2 µm. The photogenerating layer coating dispersion was prepared by mixing 2.7 g or 5.4 wt % of chlorogallium phthalocyanine (ClGaPc) Type C pigment, 2.3 g or 4.6 wt % of the polymeric binder, VMCH (carboxyl modified vinyl copolymer, Dow Chemical Company), 15 g or 30 wt % of n-butyl acetate and 30 g or 60 wt % of xylene. The resulting mixture was milled in an attritor mill with about 200 g of 1 mm Hi-Bea borosilicate glass beads for about 3 hours. The dispersion mixture obtained then was filtered through a 20 µm Nylon cloth filter resulting in a solids content of the dispersion after dilution of about 6 wt %.

Subsequently, using known spray processes, a 30 µm thick CTL was coated on top of the photogenerating layer using a dispersion prepared from N,N'-diphenyl-N,N-bis(3-methylphenyl)-1,1'-biphenyl-4,4'-diamine (5.38 g or 13.4 wt %), a film-forming polymer binder, PCZ-400 ([poly(4,4'-dihydroxy-diphenyl-1-1-cyclohexane, $M_w$=40,000)] available from Mitsubishi Gas Chemical Company, Ltd.) (7.13 g or 17.7 wt %) and PTFE POLYFLON™ L-2 microparticles (1 g or 2.5 wt %) available from Daikin Industries in a solvent mixture of 20 g or 49.7 wt % of tetrahydrofuran (THF), and 6.7 g or 16.7 wt % of toluene processed through a CAV-IPRO™ 300 nanomizer (Five Star Technology, Cleveland, Ohio). The CTL was dried at about 120° C. for about 40 minutes.

Example 1

Preparation of Photoreceptor with Sulfonamide-Doped Undercoat

A photoconductor was prepared by repeating the above process of Comparative Example 1, except that 1.5 g or 4.8 wt % of the sulfonamide, N-butyl benzene sulfonamide, obtained from Unitex Chemical, was added into the hole blocking layer dispersion of Comparative Example 1, with the amounts of the remaining ingredients reduced accordingly.

A 30 mm aluminum drum substrate then was coated with the aforementioned generated dispersion. More specifically, after drying at 160° C. for 20 minutes, a hole blocking layer of $TiO_2$ in a mixture of phenolic resin and the above N-butyl benzene sulfonamide ($TiO_2$/phenolic resin/N-butyl benzene sulfonamide ratio of 57.1/38.1/4.8) was coated on the 30 mm aluminum drum in accordance with the process of Comparative Example 1 resulting in an about 8 µm thick hole blocking layer.

Example 2

Comparative Studies

Electrical Property Testing

The above prepared photoconductors of Comparative Example 1 and of Example 1 were tested in a scanner set to obtain photoinduced discharge cycles, sequenced at one charge-erase cycle followed by one charge-expose-erase cycle, wherein the light intensity was incrementally increased with cycling to produce a series of photoinduced discharge characteristic curves (PIDC) from which the photosensitivity and surface potentials at various exposure intensities were measured. Additional electrical characteristics were obtained by a series of charge-erase cycles with incrementing surface potential to generate several voltage versus charge density curves. The scanner was equipped with a scorotron set to a constant voltage charging at various surface potentials. The photoconductors were tested at surface potentials of 700 volts with the exposure light intensity incrementally increased by regulating a series of neutral density filters. The exposure light source was a 780 nm light emitting diode. The xerographic simulation was conducted in an environmentally controlled, light tight chamber at dry conditions (10% relative humidity and 22° C.).

The above prepared photoconductors exhibited substantially similar PIDCs. Thus, incorporation of the sulfonamide of Example 1 into the hole blocking or undercoat layer did not adversely impact the electrical properties of the photoconductor.

Ghosting Measurement

The Comparative Example 1 and the Example 1 photoconductors were acclimated at room temperature for 24 hours before testing in a closed container chamber (85° F. and 80% humidity) for A ghosting. Print testing was accomplished in the Xerox Corp. WorkCentre™ Pro C3545 using the K (black toner) station at t of 500 print counts (t=500 is the 500$^{th}$ print) and in the CMY station of the color WorkCentre™ Pro C3545 which operated from t of 0 to t of 500 print counts. The prints for determining ghosting characteristics include placing an X symbol or letter on a half tone image. When X is invisible, the ghost level is assigned Grade 0; when X is barely visible, the ghost level is assigned Grade 1; and Grade 2 to Grade 5 refer to the level of visibility of X with Grade 5 being a dark and visible X. Ghosting levels were visually measured against an empirical scale, the lower the ghosting grade (absolute value), the better the print quality. The ghosting results are summarized in Table 1.

The Comparative Example 1 and Example 1 photoconductors were also acclimated in J zone conditions (75° F. and 10% humidity) in a closed container chamber for 24 hours before print tested, as above, to assess J zone ghosting. The ghosting results also are summarized in Table 1.

TABLE 1

| | UCL Composition | |
|---|---|---|
| | A Zone Ghosting T = 500 prints | J Zone Ghosting T = 500 prints |
| Comparative Example 1 (No Sulfonamide) | Grade - 5 | Grade - 6 |
| Example 1 (4.8 Wt % of Sulfonamide) | Grade - 3 | Grade - 4.5 |

Incorporation of the sulfonamide into the undercoat layer (UCL) reduced ghosting by about 2 grades in the A zone and by about 1.5 grades in the J zone, which reduction results in superior xerographic print quality, as determined by visual observation.

Adhesion Test

The adhesion characteristics of the Comparative Example 1 and the Example 1 photoconductors, between the hole blocking or undercoat layer and the aluminum drum substrate thereof, was tested using the following process.

The photoconductor drums were scored with a razor in a crosshatch pattern at about 4 mm to about 6 mm spacing. A 1 inch piece of commercially available scotch tape (3M) then was affixed to the scored site of each photoconductor, and then removed to determine the amount of delamination of the layered material onto the adhesive tape. The results are summarized in Table 2. The scale ranges from Grade 1 to Grade 5 where Grade 1 is almost no delamination and Grade 5 is almost complete delamination.

TABLE 2

| UCL Composition | Adhesion Grade |
|---|---|
| Comparative Example 1 (No Sulfonamide) | 1.5 |
| Example 1 (4.8 Wt % of the Sulfonamide) | 1.5 |

Incorporation of the sulfonamide into the undercoat or hole blocking layer had substantially no impact on the adhesion characteristics between the hole blocking or undercoat layer and the substrate.

Coating Layers Removal

The photoconductors of Comparative Example 1 and of Example 1 separately were immersed in a solution of 80 wt % of N-methyl-2-pyrrolidone (NMP), 8 wt % of citric acid and 12 wt % of water at 85° C. The hole blocking coating layer removal of the experimental photoreceptor was compared with the immersion time and the % of the hole blocking layer removal of the control by visual observation, resulting in the data summarized in Table 3. The aluminum substrate is a shiny silver color while the coating layer is green.

It was determined by visual observation by the absence of the green color that by adding the sulfonamide to the hole blocking or undercoat layer, the coating layers of the experimental photoreceptor were removed completely in the stripping protocol.

TABLE 3

| UCL Composition | Incubation Time of Coating Layer Reaction |
|---|---|
| Comparative Example 1 (No Sulfonamide) | At 10 Min., ~90% of Coating Layers Remain |
| Example 1 (4.8 Wt % of Sulfonamide) | 5 Min. for Complete Removal (100%) of All Coating Layers |

Incorporation of the sulfonamide in the hole blocking layer facilitated layer removal, only a 5 minute incubation was needed to completely remove the coating layers from the substrate for the Example 1 photoconductor. In contrast, after 10 minutes, 90% of the coating layers (including CTL, CGL and UCL) remained on the substrate of the Comparative Example 1 photoconductor (no sulfonamide in the undercoat layer).

All references cited herein are herein incorporated by reference in entirety.

It will be appreciated that variants of the above-disclosed and other features and functions, or alternatives thereof, may be combined with other and different systems or applications. Various presently unforeseen or unanticipated alternatives, changes, modifications, variations or improvements subsequently may be made by those skilled in the art to and based on the teachings herein without departing from the spirit and scope of the embodiments, and which are intended to be encompassed by the following claims.

The invention claimed is:

1. A method for recovering a substrate from a photoreceptor, comprising:

a) exposing said photoreceptor comprising an undercoat comprising a film-forming material and a sulfonamide to a stripping solvent comprising an aprotic polar material; and b) recovering said substrate free of said undercoat.

2. The method of claim 1, wherein said photoreceptor comprises one or more of a conductive layer, a hole blocking layer, an adhesion interface layer, a charge generating layer, a charge transport layer, a ground strip layer or an overcoat.

3. The method of claim 1, wherein said undercoat further comprises a metal oxide.

4. The method of claim 1, wherein said film-forming material comprises a phenolic rein.

5. The method of claim 1, wherein said metal oxide comprises titanium oxide.

6. The method of claim 1, wherein said substrate comprises an electrically conductive material.

7. The method of claim 2, wherein said photoreceptor comprises a hole blocking layer, and said hole blocking layer comprises a sulfonamide.

8. The method of claim 1, wherein said stripping solvent further comprises a weak acid.

9. The method of claim 1, wherein said aprotic polar material comprises dimethyl sulfoxide, formamide, dioxane, tetrahydrofuran, dichloromethane, ethyl acetate, acetone, acetonitrile or N-methylpyrrolidone.

10. The method of claim 1, wherein said aprotic polar material comprises from about 75% to about 85% w/v or v/v of said solvent.

11. The method of claim 8, wherein said weak acid comprises an organic acid.

12. The method of claim 8, wherein said weak acid comprises lactic acid, citric acid, acetic acid, formic acid, oxalic acid or uric acid.

13. The method of claim 8, wherein said weak acid comprises from about 5% to about 15% w/v or v/v of said solvent.

14. The method of claim 8, wherein said exposing is at a temperature of less than about 100° C.

15. The method of claim 1, wherein said sulfonamide comprises N-butyl benzene sulfonamide, o,p-toluene sulfonamide, N-ethyl-o,p-toluene sulfonamide or N-(2-hydroxylpropyl)benzene sulfonamide.

16. The method of claim 7, wherein said sulfonamide comprises N-butyl benzene sulfonamide, o,p-toluene sulfonamide, N-ethyl-o,p-toluene sulfonamide or N-(2-hydroxylpropyl)benzene sulfonamide.

17. The method of claim 3, wherein said metal oxide comprises from about 20 wt % to about 80 wt % of said undercoat.

18. The method of claim 1, wherein said exposing occurs under atmospheric pressure.

* * * * *